(12) United States Patent
Takase (10) Patent No.: US 8,215,793 B2
(45) Date of Patent: Jul. 10, 2012

(54) BACKLIGHT DEVICE

(75) Inventor: Kenji Takase, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/741,085

(22) PCT Filed: Jul. 18, 2008

(86) PCT No.: PCT/JP2008/063000
§ 371 (c)(1),
(2), (4) Date: May 3, 2010

(87) PCT Pub. No.: WO2009/066487
PCT Pub. Date: May 28, 2009

(65) Prior Publication Data
US 2010/0265695 A1 Oct. 21, 2010

(30) Foreign Application Priority Data
Nov. 19, 2007 (JP) ................... 2007-299151

(51) Int. Cl.
*F21V 14/00* (2006.01)
(52) U.S. Cl. ............... 362/225; 362/217.08; 362/247; 362/255
(58) Field of Classification Search ........... 362/217.08, 362/217.09, 223, 224, 225, 240, 241, 242, 362/243, 246, 247, 255, 256, 260, 614
See application file for complete search history.

(56) References Cited

U.S. PATENT DOCUMENTS

| 3,115,309 A | * | 12/1963 | Spencer | 362/217.08 |
| 7,954,969 B2 | * | 6/2011 | Matsukawa et al. | 362/247 |
| 2007/0291508 A1 | * | 12/2007 | Boonekamp | 362/246 |

FOREIGN PATENT DOCUMENTS

| JP | 08-298100 A | 11/1996 |
| JP | 2003-228065 A | 8/2003 |
| JP | 2004-265681 A | 9/2004 |

OTHER PUBLICATIONS

Official Communication issued in International Patent Application No. PCT/JP2008/063000, mailed on Aug. 26, 2008.

* cited by examiner

*Primary Examiner* — Y My Quach Lee
(74) *Attorney, Agent, or Firm* — Keating & Bennett, LLP (57) ABSTRACT

A pair of band-shaped window portions (9) having no fluorescent film is formed in the inner circumference of a fluorescent lamp (1). The fluorescent lamp (1) is oriented such that a straight line intersecting the center of the fluorescent lamp (1) and the midpoint between the pair of window portions on the circumference intersects the midpoint between a pair of reflective members (10) on a reflective plate (3), and is arranged such that light emitted from the pair of window portions (9) is reflected off the pair of reflective members (10) and is shone on a diffusion plate (4).

3 Claims, 7 Drawing Sheets

BACKLIGHT DEVICE

TECHNICAL FIELD

The present invention relates to a direct backlight device that is used as a backlight source in a liquid crystal display device.

BACKGROUND ART

Figure 12:
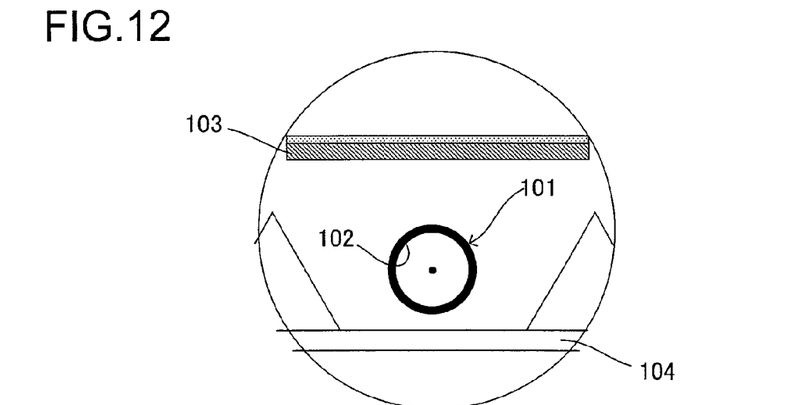
FIG. 12 is a side cross-sectional view showing an enlarged part of a common backlight device.

As shown in FIG. 12, a direct backlight device that is used as a backlight source in a liquid crystal display device is formed by arranging a fluorescent lamp 101 below a diffusion plate 103. In a general backlight device, a fluorescent film 102 having approximately the same thickness is formed over the inner surface of the tubular fluorescent lamp 101, and either light emitted from the fluorescent lamp 101 is directly directed to the diffusion plate 103 or light emitted to the opposite side from the diffusion plate 103 is reflected off a reflective plate 104 and is then directed to the diffusion plate 103.

Figure 13:
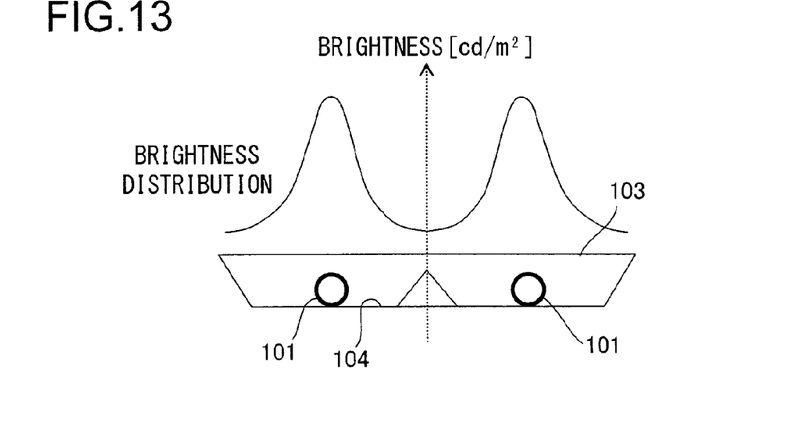
FIG. 13 is a diagram showing the brightness distribution of light shone to the distribution plate of the backlight unit of FIG. 12.

However, in this general type of backlight device, the intensity of light that enters the diffusion plate 103 directly from the fluorescent lamp 101 is greatest at a portion which is closest to the fluorescent lamp 101 and which is directly above the fluorescent lamp 101, and as a portion is located further away from the portion directly above the fluorescent lamp 101, that is, the portion is further away from the fluorescent lamp 101, the light intensity is decreased. Although the portion away therefrom receives light reflected off the reflective plate 104, the light intensity varies on the light receiving side of the diffusion plate 103. Hence, as shown in FIG. 13, the brightness of illumination light varies due to those variations.

Figure 14:
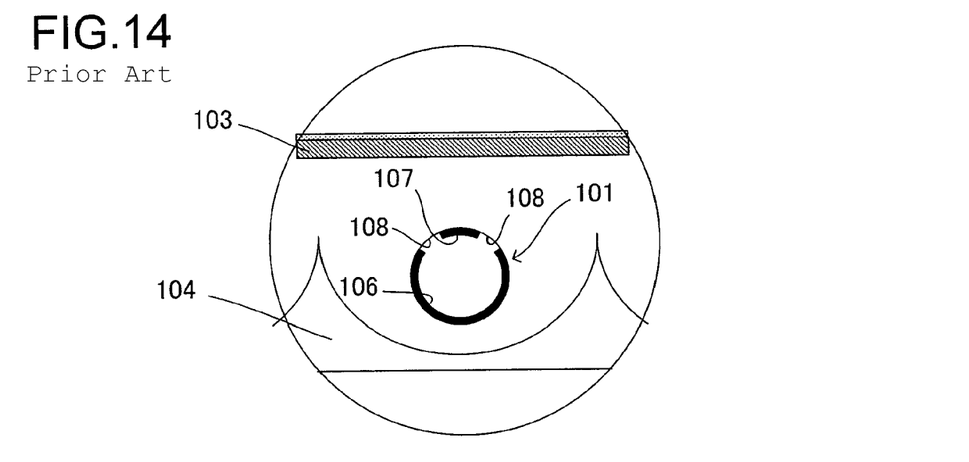
FIG. 14 is a side cross-sectional view showing an enlarged part of a conventional common backlight device disclosed in patent document 1.

Hence, patent document 1 discloses the following: as shown in FIG. 14, a band-shaped fluorescent film 106 having a predetermined thickness is formed on the lower side of the inner surface of the fluorescent lamp 101 such that an angle formed by the fluorescent film is about 200 degrees; a band-shaped fluorescent film 107 having the same material and thickness as the one described above is formed in the middle portion of the upper surface side such that an angle formed by the fluorescent film is about 50 degrees; and thus, in an area, on the left and right of the fluorescent film 107 in the middle portion, in which an angle formed by the area is about 55 degrees, a pair of transparent light transmission window portions 108 having no fluorescent film is formed.

According to patent document 1, the intensity of light emitted from the fluorescent lamp 101 is greater in the middle portion of the upper surface side, where the fluorescent film 107 is formed, than in the window portions 108, but the distance traveled by the light that is emitted from the fluorescent lamp 101 and that reaches the diffusion plate 103 is greater from the middle portion of the upper surface side, where the fluorescent film 107 is formed, than from the window portions 108, with the result that it is possible to reduce variations in the intensity of light entering the diffusion plate 103.

Patent document 1: JP-A-H08-298100 (paragraph [0023] and FIG. 3)

DISCLOSURE OF THE INVENTION

Problems to be Solved by the Invention

Figure 15:
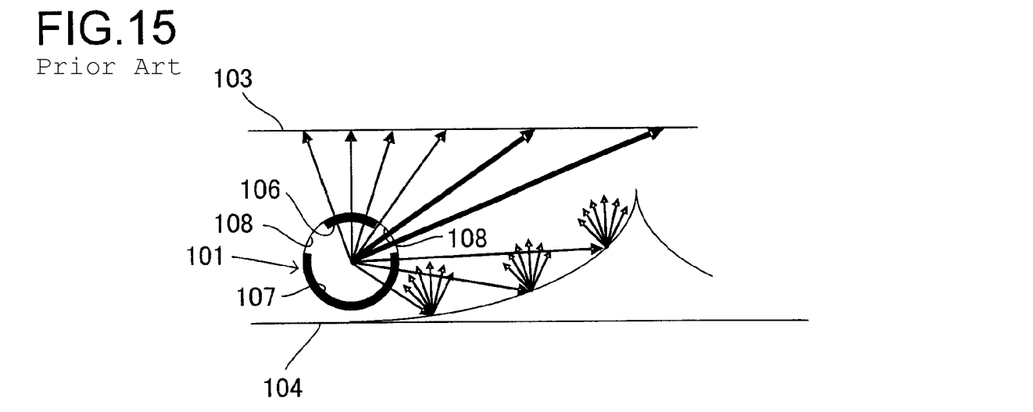
FIG. 15 is an enlarged side cross-sectional view for describing an optical path of light emitted from the fluorescent lamp of the conventional backlight unit of FIG. 14.
Figure 16:
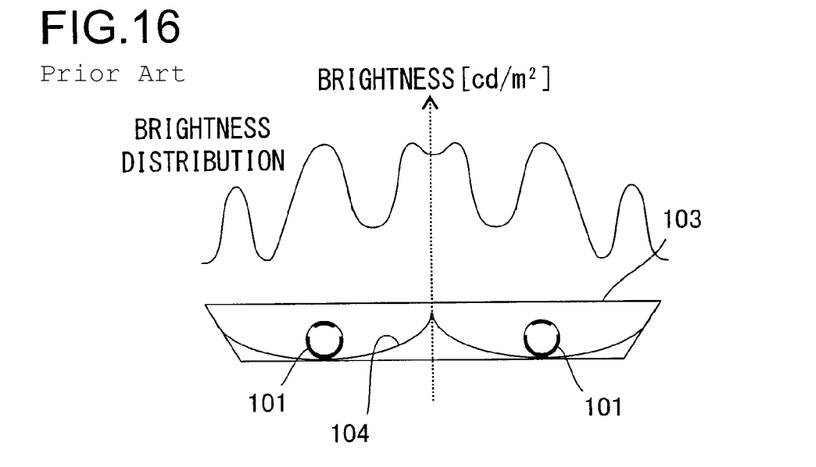
FIG. 16 is a diagram showing the brightness distribution of light shone on the distribution plate of the conventional backlight unit of FIG. 14.

However, in the invention of patent document 1, as shown in FIG. 15, the light emitted from the window portions 108 is directly shone on the diffusion plate 103, and thus, as shown in FIG. 16 that illustrates the brightness distribution of the illumination light, those portions appear as band-shaped bright lines, with the result that unevenness disadvantageously appears. As the distance between the fluorescent lamp 101 and the diffusion plate 103 is shorter, this phenomenon becomes more significant, and thus the unevenness becomes more noticeable. When a plurality of fluorescent lamps 101 are arranged in parallel, the light emitted from the fluorescent lamps overlaps, and thus the brightness is increased, with the result that the unevenness becomes more unsightly.

The present invention is designed in view of the foregoing conventional problem, and has an object to produce uniform brightness distribution of illumination light with simply configured lamps in a direct backlight device.

Means for Solving the Problem

To achieve the above object, according to one aspect of the present invention, there is provided a backlight device that includes: a tubular fluorescent lamp which is supported on a reflective plate and in which a fluorescent film having a predetermined thickness is formed on an inner circumference; a diffusion plate which is arranged above the fluorescent lamp; and a pair of band-shaped reflective members which is provided on the reflective plate such that the reflective members are axisymmetric with respect to a tube axis of the fluorescent lamp and are parallel to each other. In the backlight device, a pair of band-shaped window portions having no fluorescent film is formed in the inner circumference of the fluorescent lamp, and the fluorescent lamp is oriented such that a straight line intersecting a center of the fluorescent lamp and a midpoint between the pair of window portions on the circumference intersects a midpoint between the pair of reflective members on the reflective sheet, and is arranged such that light emitted from the pair of window portions is reflected off the pair of the reflective members or the reflective plate and is shone on the diffusion plate.

With this configuration, since the light from the window portions having no fluorescent film is diffused and reflected off the reflective members or the reflective plate and is shone on the diffusion plate without being directly shone on the diffusion plate, it is possible to obtain the brightness distribution of illumination light with little unevenness, that is, more uniform brightness distribution. Hence, it is possible to provide a backlight unit that can uniformly illuminate the entire liquid crystal display.

In the backlight device of the present invention, a plurality of pairs of window portions may be formed, and, as the window portions are located closer to the bottom portion of the fluorescent lamp, the length (opening width) of the window portions along the circumference of the fluorescent lamp may be reduced.

With this configuration, light that is emitted from the window portion having a wider opening width and that has a higher light intensity is reflected off the reflective members more than off the reflective plate, and thus the light is shone on the area in which the brightness of the diffusion plate is generally low and which is located approximately in the center between the adjacent fluorescent lamps, with the result that it is possible to significantly increase the brightness of this area with the light having the high intensity. On the other hand, light that is emitted from the window portion in the lower side of the lamp and that has a lower light intensity is reflected off the reflective plate more than off the reflective members, and thus the light is shone on the area in which the brightness of the diffusion plate 4 tends to be slightly low and which is located directly above the fluorescent lamp 1, with the result that it is possible to slightly increase the brightness of this area with the light having the low intensity. Thus, it is possible to make fine adjustments in the brightness distribution of the light shone on the diffusion plate 4, and this allows more uniform brightness distribution.

In the backlight device of the present invention, the reflective plate and the reflective members may be integrally formed of a resin having a high reflectivity.

With this configuration, it is possible not only to produce uniform brightness distribution of illumination light shone on the diffusion plate but also to reduce the material cost and the assembly time to decrease the cost.

In the backlight device of the present invention, all surfaces of the reflective plate and the reflective members may be subjected to chromium plating treatment.

With this configuration, the light that is emitted from the fluorescent lamp and that is then shone on the chromium plating treated portion of the resin molded product is mirror-reflected, and thus the amount of light that is reflected in various directions is increased. Thus, it is possible to improve the attenuation of the brightness of the backlight and produce uniform brightness distribution.

Advantages of the Invention

According to the present invention, since the light from the window portions having no fluorescent film is diffused and reflected off the reflective members or the reflective plate and is shone on the diffusion plate without being directly shone on the diffusion plate, it is possible to obtain the brightness distribution of illumination light with little unevenness, that is, more uniform brightness distribution. Hence, it is possible to provide a backlight unit that can uniformly illuminate the entire liquid crystal display.

LIST OF REFERENCE SYMBOLS

1 Fluorescent lamp
2 Enclosure (board)
3 Reflective sheet (an embodiment of a reflective plate)
4 Diffusion plate
7 Fluorescent film
8 Fluorescent film
9 Window portion
91 to 95 Window portions
10 Reflective member
14 Lamp supporting portion
15 Chromium plating treated portion

BEST MODE FOR CARRYING OUT THE INVENTION

Preferred embodiments for practicing the present invention will be described with reference to the accompanying drawings. The following embodiments will be described by way of example using a backlight unit that illuminates a liquid crystal display of, for example, about 20 inches.

A First Embodiment

Figure 1A:
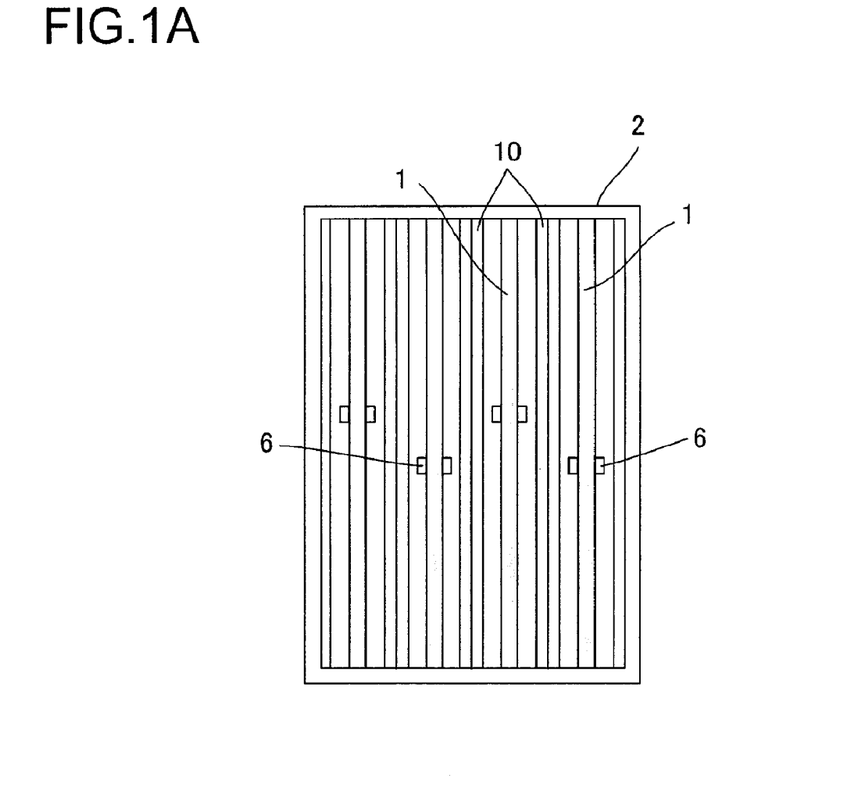
FIG. 1(a) is a top view showing a backlight unit according to a first embodiment with its diffusion plate being omitted.
Figure 1B:
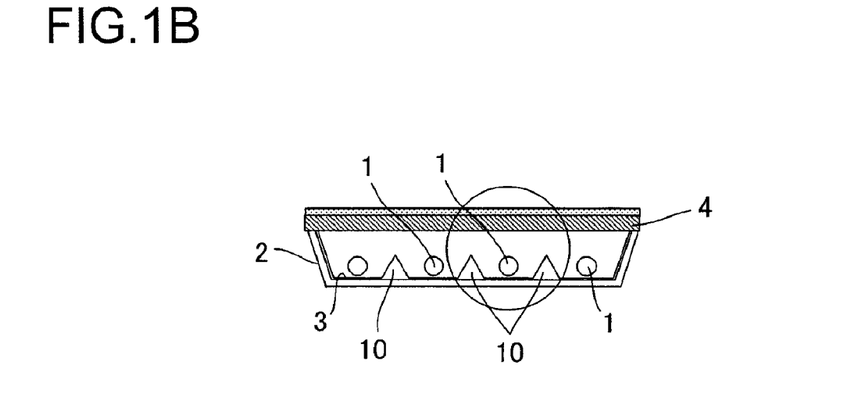
FIG. 1(b) is a side cross-sectional view of the backlight unit.
Figure 2:
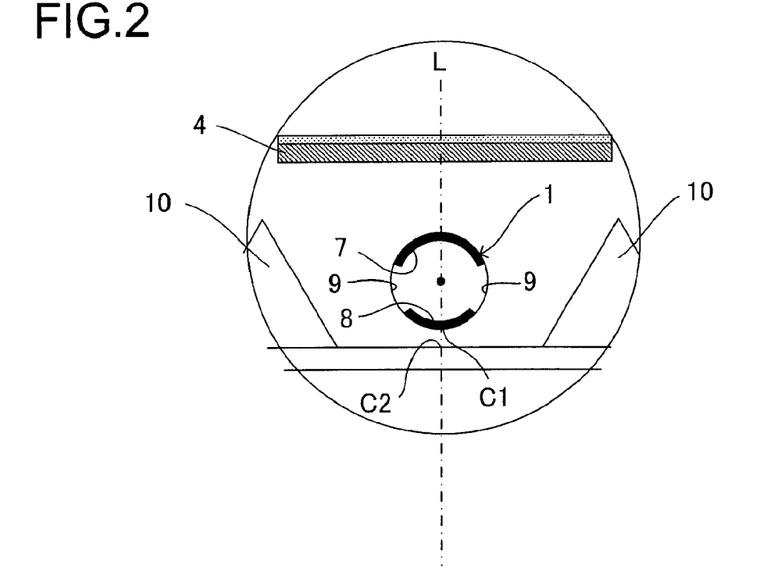
FIG. 2 is a side cross-sectional view showing an enlarged part of FIG. 1(b)

FIG. 1(a) is a top view showing a backlight unit according to a first embodiment with its diffusion plate being omitted, and FIG. 1(b) is a side cross-sectional view of the backlight unit. FIG. 2 is a side cross-sectional view showing an enlarged part of FIG. 1(b).

Figure 11:
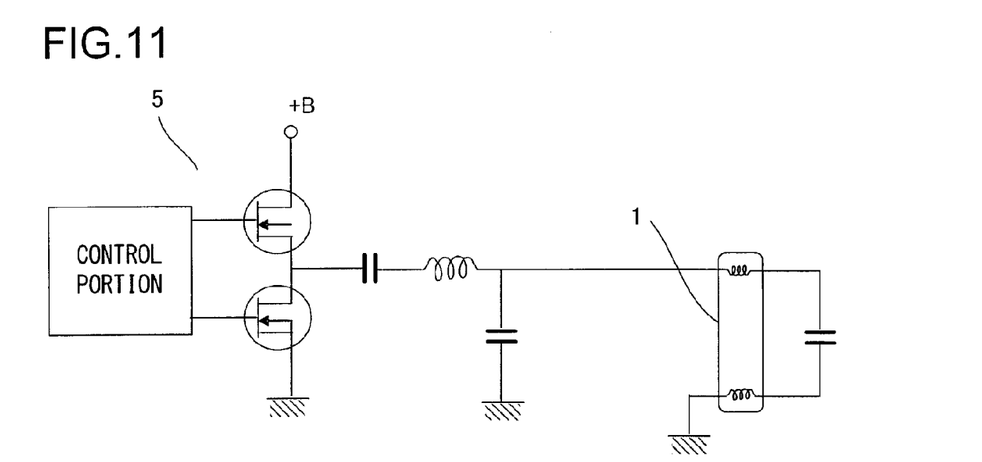
FIG. 11 is a circuit diagram of an example of a lighting circuit device used in the backlight unit.

Reference numeral 1 in the figures represents a fluorescent lamp, and reference numeral 2 represents a rectangular box-shaped enclosure (board) formed of sheet metal such as aluminum. A reflective sheet 3 is adhered to the inner surface of this enclosure 2, and a diffusion plate 4 is arranged in a top portion of the enclosure 2. The fluorescent lamp 1 is lit by an unillustrated lighting circuit device. As this lighting circuit device 5, a common lighting circuit device may be used, and, for example, as shown in FIG. 11, it is formed with an inverter circuit (series LC oscillation circuit using a half-bridge switching circuit). The reflective sheet 3 adhered to the enclosure 2 functions as a reflective plate. When the enclosure 2 is formed of a polycarbonate resin having a high reflectivity, the enclosure 2 itself can function as the reflective plate, and thus it is possible to omit the reflective sheet 3.

The fluorescent lamp 1 is a tubular light source (for example, fluorescent tube). As the diameter of the tube is increased, the area where a fluorescent material is coated is increased, and thus portions on which a fluorescent film is not coated as described later are easily formed. Hence, in this embodiment, a hot cathode fluorescent tube is used, and, preferably, in consideration of the balance between its thickness and the total flux, a 15.5 mm diameter hot cathode fluorescent tube is used. The lamp is not limited to linear lamps; a U-shaped lamp, a W-shaped lamp or the like having a linear portion may be used.

The fluorescent lamp 1 is supported by a lamp fixation pin 6 fixed to the bottom surface of the enclosure 2. In this supporting structure, a plurality of fluorescent lamps 1 are arranged in parallel at predetermined spaces within the enclosure 2.

The fluorescent lamp 1 is formed with a cylindrical glass tube having a thickness of about 0.5 mm, and includes therein a coil-shaped filament electrode (formed of tungsten W or the like) coated with an electron emission substance (formed of an oxide of an alkaline earth metal such as Ba, Ca or Sr, a tungstate of an alkaline earth metal or the like). Mercury or a noble gas (such as Ar) is sealed in the fluorescent lamp 1. As shown in the enlarged diagram of FIG. 2, on the upper surface side of the inner wall of the fluorescent lamp 1, a three wavelength fluorescent film 7 obtained by mixing fluorescent materials having R, G and B light emission regions is formed in the shape of a band along a tube axis such that the fluorescent film 7 has a predetermined film thickness and that a relatively wide angle is formed by the fluorescent film 7; in the middle portion of the lower surface side, a fluorescent film 8 having the same material and thickness as the one described above is formed in the shape of a band along the tube axis such that a relatively narrow angle is formed by the fluorescent film 8; and, in the left and right side portions of the inner wall of the fluorescent lamp 1 between the fluorescent film 7 and the fluorescent film 8, transparent light transmission window portions 9 having no fluorescent film coated are formed in the shape of a band along the tube axis.

For each of the fluorescent lamps 1, on the bottom surface of the enclosure 2, a pair of reflective members 10 having a triangular band shape in cross section is provided such that they are axisymmetric with respect to the tube axis and are parallel to each other. Since, as described above, a plurality of fluorescent lamps 1 are arranged in parallel at predetermined spaces, the reflective members 10 having an isosceles triangular shape in cross section are arranged in parallel at equal spaces, and thus it is possible to use common reflective members as the reflective members 10 that are arranged between the adjacent fluorescent lamps. As with the reflective sheet 3, the reflective member 10 is formed of, for example, a polycarbonate resin having a high reflectivity, and the reflective sheet 3 is placed on the bottom surface of the enclosure 2 so as not to overlap the reflective member 10.

Figure 3:
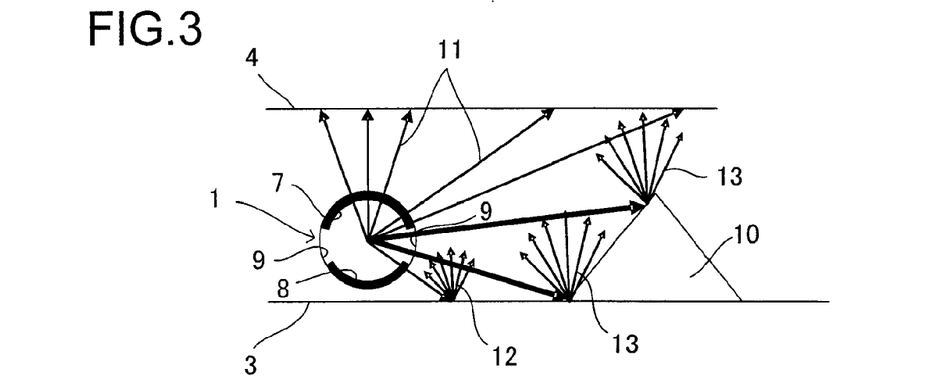
FIG. 3 is an enlarged side cross-sectional view for describing optical paths of light emitted from a fluorescent lamp in the backlight unit of FIG. 1.

As shown in FIG. 2, the fluorescent lamp 1 having the window portions 9 formed is oriented such that a straight line L intersecting the center of the fluorescent lamp 1 and the midpoint C1 between the pair of window portions 9 on the circumference of the fluorescent lamp 1 intersects the midpoint C2 between the pair of reflective members 10 on the reflective sheet 3, and is also arranged such that light emitted from the pair of window portions 9 is reflected off the pair of the reflective members 10 and is shone on the diffusion plate 4 (see FIG. 3).

In the backlight device configured as described above, when the fluorescent lamp 1 is lit through the lighting circuit device, as shown in FIG. 3, the fluorescent films 7 and 8 are excited by discharge within the glass tube, and thus light is produced and emitted. Then, part of the light is transmitted through the fluorescent films 7 and 8 and is diffused and directed to the outside of the lamp, and is then emitted as direct light 11 to the diffusion plate 4 or is reflected off the reflective sheet 3 or the reflective members 10 and is emitted as reflected light 12. Part of the light is also transmitted through the window portions 9 and is directed to the outside of the fluorescent lamp 1, and is then reflected off the reflective sheet 3 or the reflective members 10 and is emitted to the diffusion plate 4 as reflected light 13.

Figure 4:
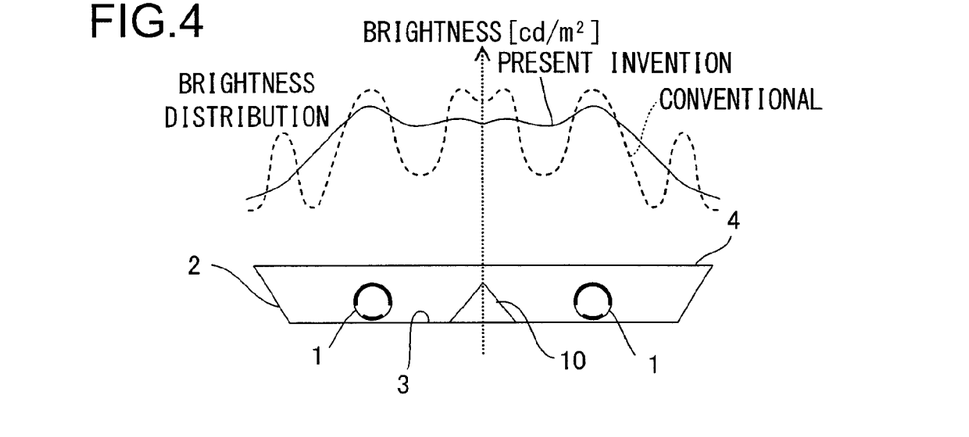
FIG. 4 is a diagram showing the brightness distribution of illumination light to the distribution plate in the backlight unit of FIG. 1.

In the first embodiment, the light emitted from the window portions 9 having no fluorescent film is diffused and reflected off the reflective sheet 3 or the reflective members 10 and is then shone on the diffusion plate 4 without being directly shone on the diffusion plate 4, and thus it is possible to obtain, as shown in FIG. 4, the brightness distribution of illumination light with little unevenness, that is, more uniform brightness distribution. Hence, it is possible to provide a backlight unit that can uniformly illuminate the entire liquid crystal display.

Moreover, the first embodiment is highly effective in reducing the height of the backlight unit. Specifically, in the conventional technology, since, when the height is reduced (the distance between the lamp and the diffusion plate is reduced), the length (opening width) of the window portion having the fluorescent film formed along the circumference of the fluorescent lamp is reduced, it is difficult to perform the associated processing, with the result that it is difficult to accurately adjust the position from which the light emitted from the window portions is shone on the diffusion plate 4. In this embodiment, however, since the light is diffused and reflected off the reflective sheet 3 or the reflective members 10, it is necessary to reduce the opening width to a lesser degree, and thus it is easy to reduce the height of the backlight unit.

A Second Embodiment

Figure 5A:
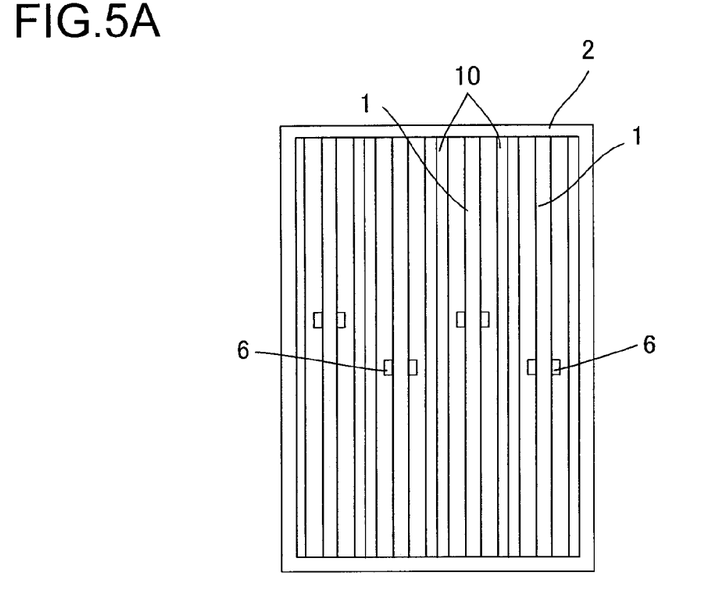
FIG. 5(a) is a top view showing a backlight unit according to a second embodiment with its diffusion plate being omitted.
Figure 5B:
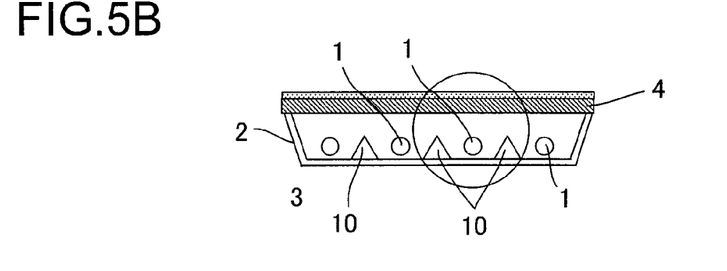
FIG. 5(b) is a side cross-sectional view of the backlight unit.
Figure 6:
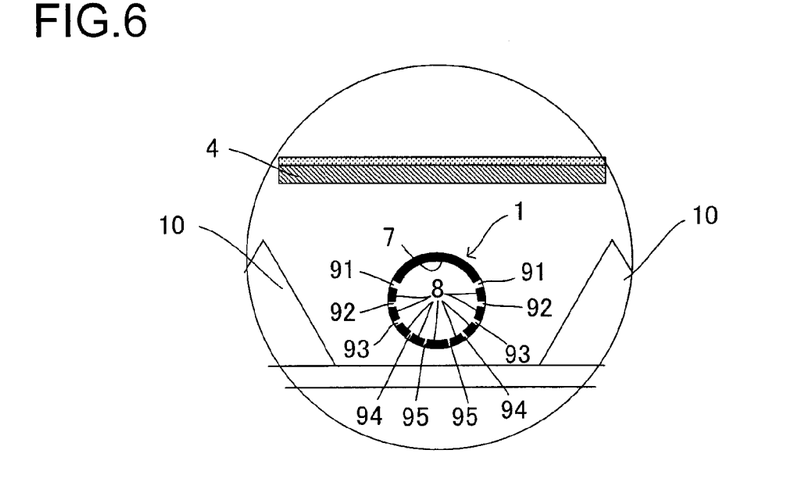
FIG. 6 is a side cross-sectional view showing an enlarged part of FIG. 5(b)

FIG. 5(a) is a top view showing a backlight unit according to a second embodiment with its diffusion plate being omitted, and FIG. 5(b) is a side cross-sectional view of the backlight unit. FIG. 6 is a side cross-sectional view showing an enlarged part of FIG. 5(b). In these figures, the same parts as those in the backlight unit of the first embodiment are identified with common reference numerals, and their description will not be repeated.

In the second embodiment, a plurality of pairs (in FIG. 6, five pairs 91, 92, 93, 94 and 95) of window portions having no fluorescent film are formed in the inner surface of the fluorescent lamp 1, and, as the window portion is located closer to the bottom portion, its opening width is decreased.

In the second embodiment, light that is emitted from the window portion having a wider opening width and that has a higher light intensity is reflected off the reflective members 10 more than off the reflective sheet 3, and thus the light is shone on the area in which the brightness of the diffusion plate 4 is generally low and which is located approximately in the center between the adjacent fluorescent lamps 1, with the result that it is possible to significantly increase the brightness of this area with the light having the high intensity. On the other hand, light that is emitted from the window portion in the lower side of the lamp and that has a lower light intensity is reflected off the reflective sheet 3 more than off the reflective members 10, and thus the light is shone on the area in which the brightness of the diffusion plate 4 tends to be slightly low and which is located directly above the fluorescent lamp 1, with the result that it is possible to slightly increase the brightness of this area with the light having the low intensity. Thus, it is possible to make fine adjustments in the brightness distribution of the light shone on the diffusion plate 4, and this allows more uniform brightness distribution.

In the second embodiment, since the window portions are accurately formed in the necessary locations of the inner surface of the fluorescent lamp 1, the total flux of the fluorescent lamp itself is not dropped. Thus, it is possible to provide a backlight unit that can uniformly illuminate the entire liquid crystal display.

A Third Embodiment

Figure 7A:
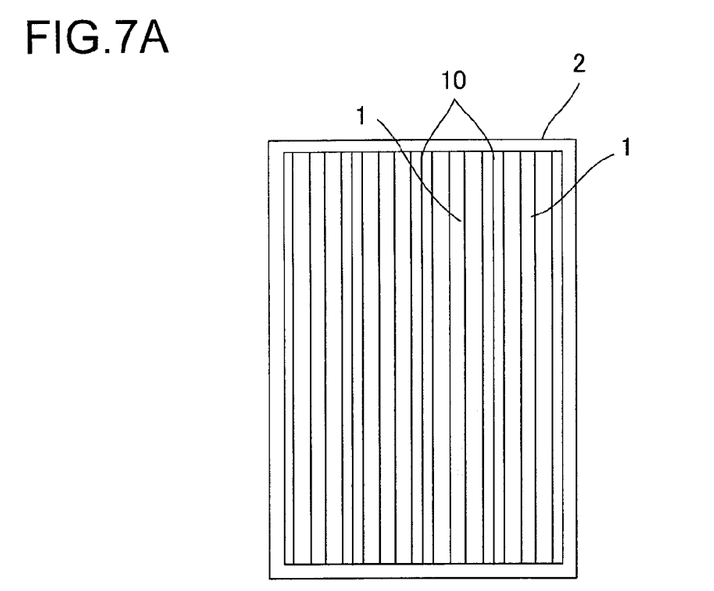
FIG. 7(a) is a top view showing a backlight unit according to a third embodiment with its diffusion plate being omitted.
Figure 7B:
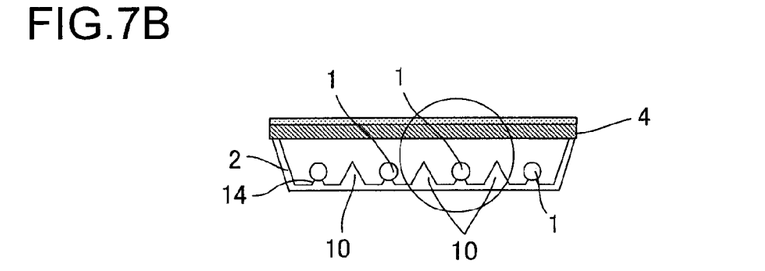
FIG. 7(b) is a side cross-sectional view of the backlight unit.
Figure 8:
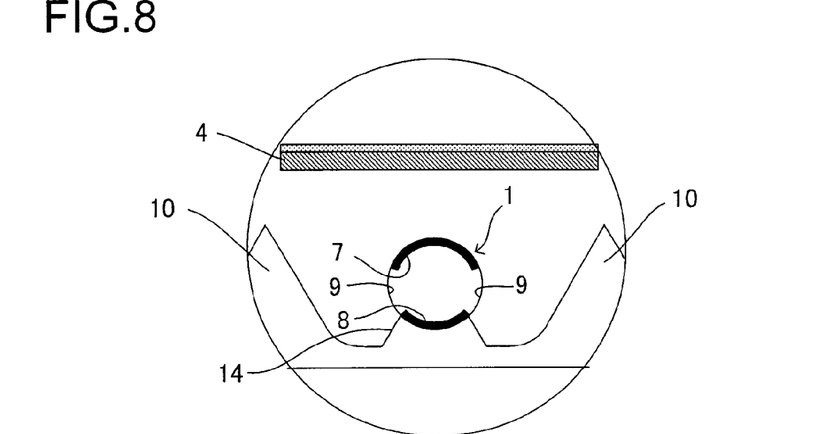
FIG. 8 is a side cross-sectional view showing an enlarged part of FIG. 7(b)

FIG. 7(a) is a top view showing a backlight unit according to a third embodiment with its diffusion plate being omitted, and FIG. 7(b) is a side cross-sectional view of the backlight unit. FIG. 8 is a side cross-sectional view showing an enlarged part of FIG. 7(b). In these figures, the same parts as those in the backlight unit of the first embodiment are identified with common reference numerals, and their description will not be repeated.

In the third embodiment, the enclosure 2 and the reflective members 10 are integrally formed of a white resin such as a polycarbonate resin having a high reflectivity. Specifically, the structure of the first embodiment, where the reflective members 10 are arranged on both sides of the fluorescent lamp 1 and the reflective sheet 3 is placed on the bottom surface of the enclosure 2, is provided by integrally forming the same structure with the white resin having a high reflectivity. In this case, the portions between the reflective members 10 and the bottom surface of the enclosure 2 are formed into a curved shape. Moreover, below the fluorescent lamp 1, a lamp supporting portion 14 in the shape of a stand is integrally formed, and simultaneously, the upper surface of the lamp supporting portion 14 is formed into a curved shape along the arc-shaped lower surface of the fluorescent lamp 1.

In the third embodiment, since the enclosure 2 and the reflective members 10 are integrally formed of a white resin such as a polycarbonate resin having a high reflectivity, it is possible not only to produce uniform brightness distribution of illumination light shone on the diffusion plate 4 but also to reduce the material cost and the assembly time to decrease the cost.

In the third embodiment, by forming the portions between the reflective members 10 and the bottom surface of the enclosure 2 into a curved shape, it is possible not only to prevent the production of a dark line that is likely to be produced in the portions therebetween but also to reduce the fabrication time of the members to decrease the cost.

In the third embodiment, since the fluorescent lamp 1 can be directly arranged on the lamp supporting portion 14, the strength against impacts is enhanced, and since the lamp fixation pin used for fixing the conventional lamp is not necessary, the component cost is reduced.

A Fourth Embodiment

Figure 9A:
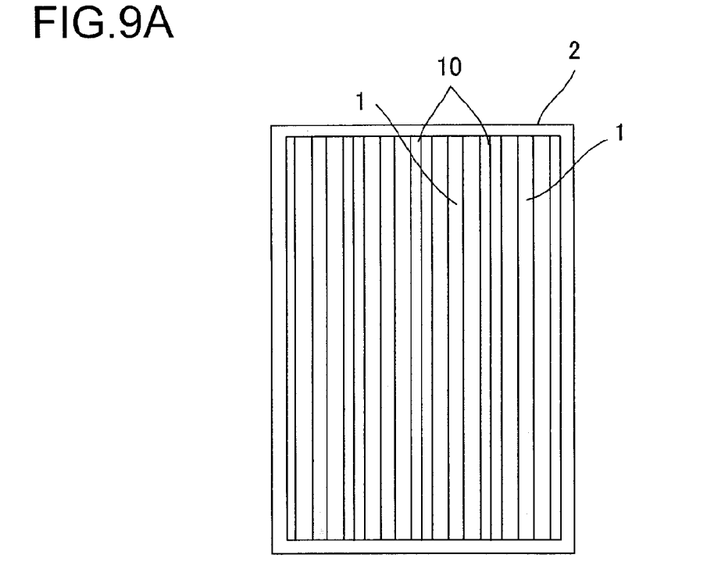
FIG. 9(a) is a top view showing a backlight unit according to a fourth embodiment with its diffusion plate being omitted.
Figure 9B:
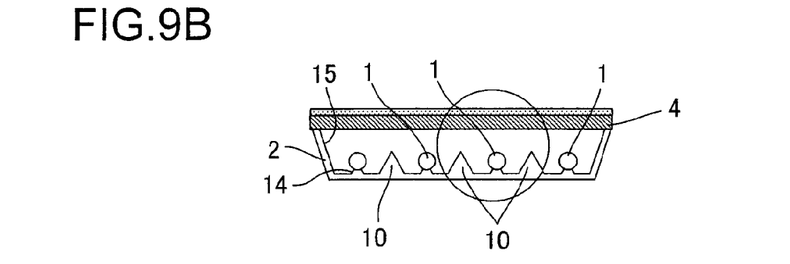
FIG. 9(b) is a side cross-sectional view of the backlight unit.
Figure 10:
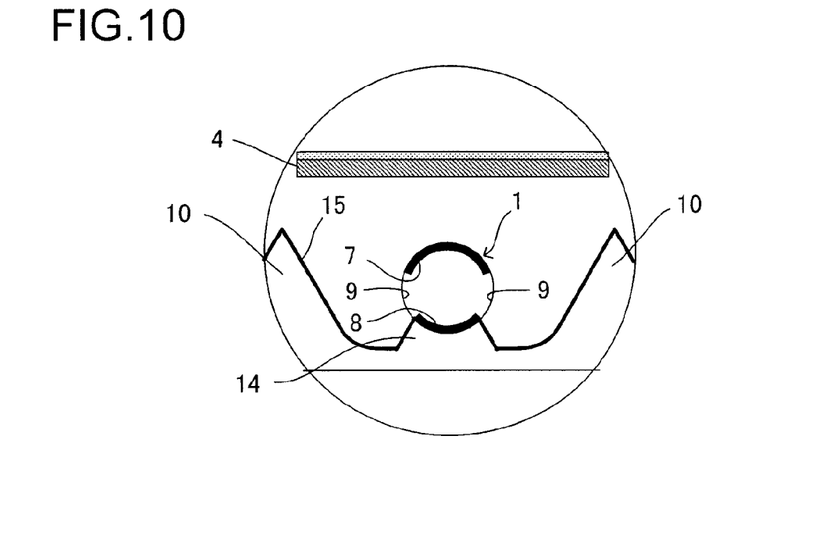
FIG. 10 is a side cross-sectional view showing an enlarged part of FIG. 9(b)

FIG. 9(a) is a top view showing a backlight unit according to a fourth embodiment with its diffusion plate being omitted, and FIG. 9(b) is a side cross-sectional view of the backlight unit. FIG. 10 is a side cross-sectional view showing an enlarged part of FIG. 9(b). In these figures, the same parts as those in the backlight unit of the third embodiment are identified with common reference numerals, and their description will not be repeated.

In the fourth embodiment, all the surfaces of a resin molded product obtained by integrally forming the enclosure 2 and the reflective members 10 as in the third embodiment are subjected to chromium plating treatment 15, and thus a mirror finish is achieved.

In the fourth embodiment, the light that is emitted from the fluorescent lamp 1 and that is then shone on the chromium plating treated portion 15 of the resin molded product is mirror-reflected, and thus the amount of light that is reflected in various directions is increased. Thus, it is possible to improve the attenuation of the brightness of the backlight and produce uniform brightness distribution.

The invention claimed is:

1. A backlight device that includes:
   a tubular fluorescent lamp which is supported on a reflective plate and in which a fluorescent film having a predetermined thickness is formed on an inner circumference;
   a diffusion plate which is arranged above the fluorescent lamp; and
   a pair of band-shaped reflective members which is provided on the reflective plate such that the reflective members are axisymmetric with respect to a tube axis of the fluorescent lamp and are parallel to each other,
   wherein a plurality of pairs of band-shaped window portions having no fluorescent film are formed in the inner circumference of the fluorescent lamp, and the fluorescent lamp is oriented such that a straight line intersecting a center of the fluorescent lamp and a midpoint between each of the pairs of window portions on the circumference intersects a midpoint between each of the pairs of reflective members on the reflective plate, and is arranged such that light emitted from each of the pairs of window portions is reflected off the pair of the reflective members or the reflective plate and is shone on the diffusion plate, and an opening width of the band-shaped window portions along a circumference of the fluorescent lamp decreases in portions of the band-shaped window portions located closer to a bottom portion of the fluorescent lamp.

2. The backlight device of claim 1,
   wherein the reflective plate and the reflective members are integrally formed of a resin having a high reflectivity.

3. The backlight device of claim 2,
   wherein all surfaces of the integrally formed reflective plate and reflective members are subjected to chromium plating treatment.

* * * * *